Feb. 7, 1933.  E. H. LICHTENBERG  1,896,711
RUBBER JOINTED CHAIN FOR TRENCH EXCAVATING DEVICES
Filed Dec. 31, 1930  3 Sheets-Sheet 1
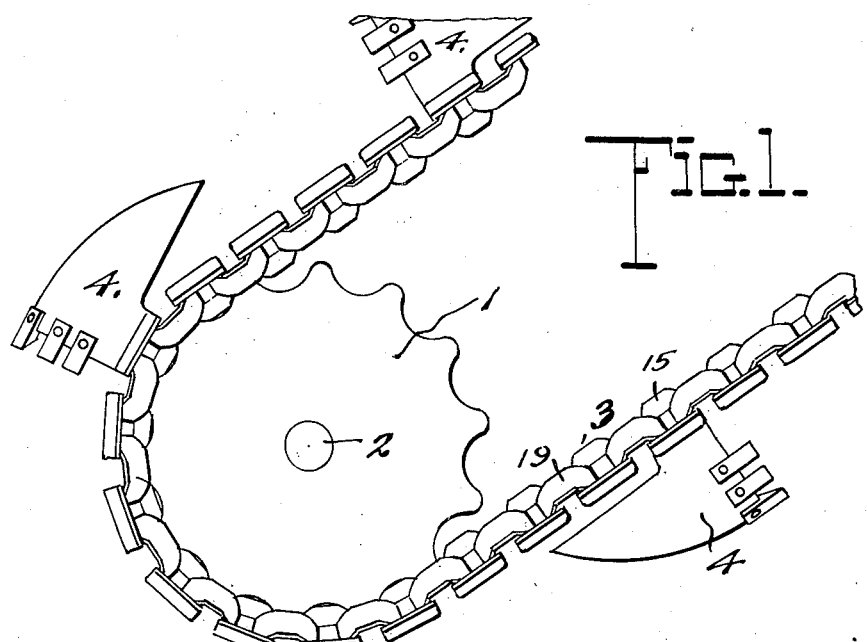
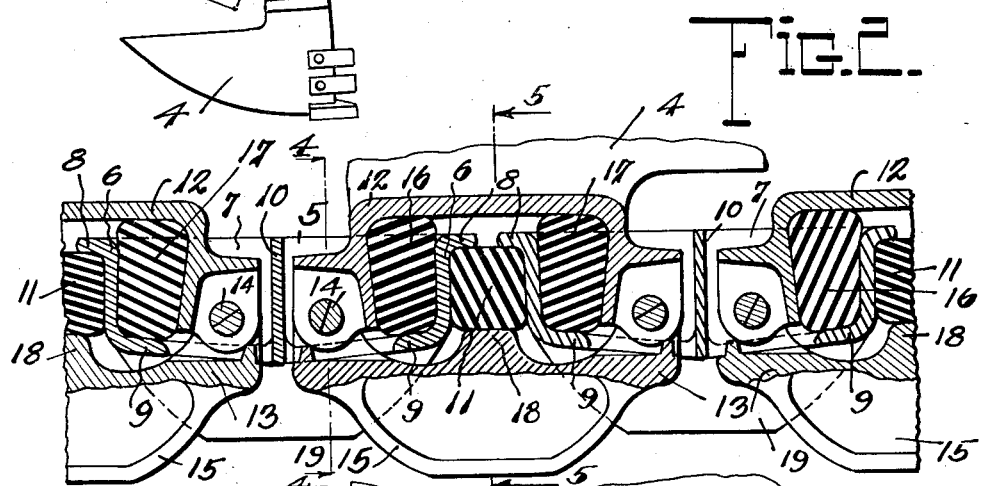
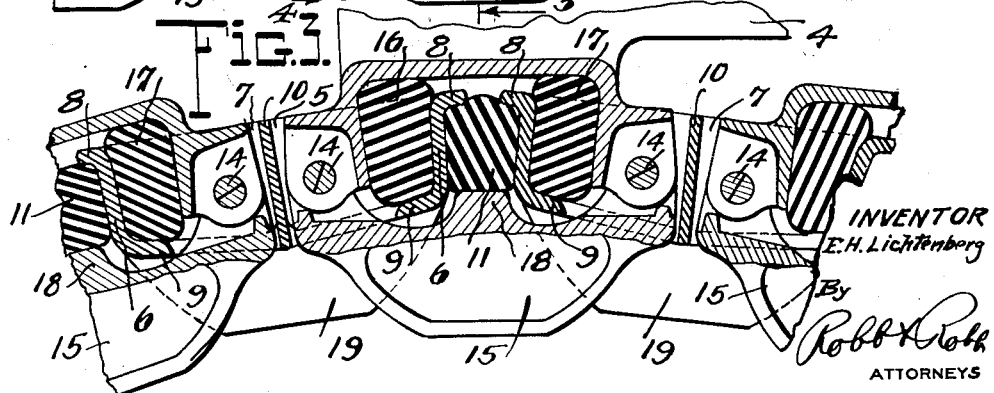
INVENTOR
E. H. Lichtenberg
By
ATTORNEYS

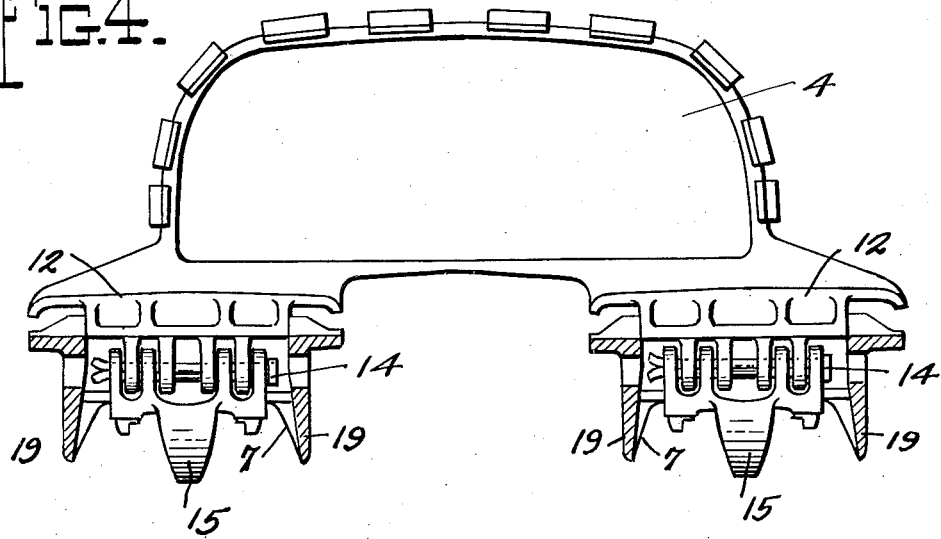
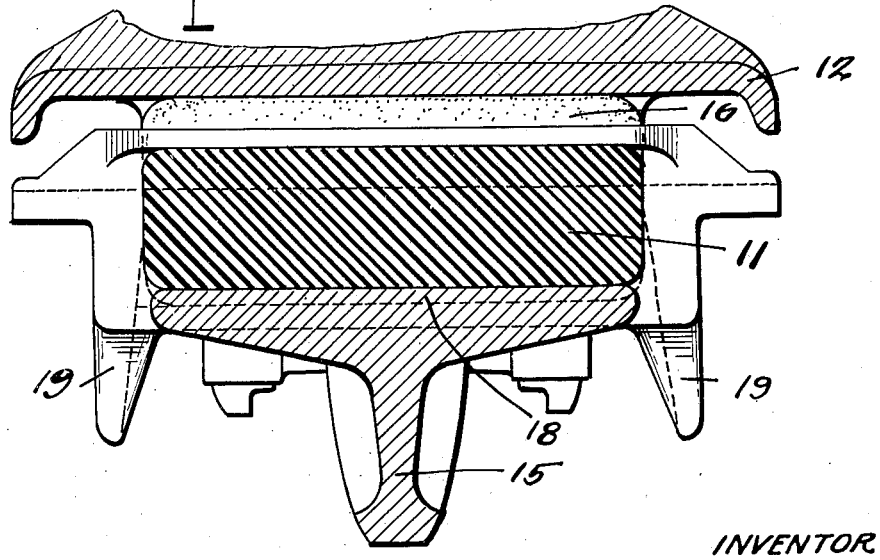

Feb. 7, 1933.　　　E. H. LICHTENBERG　　　1,896,711
RUBBER JOINTED CHAIN FOR TRENCH EXCAVATING DEVICES
Filed Dec. 31, 1930　　　3 Sheets-Sheet 3
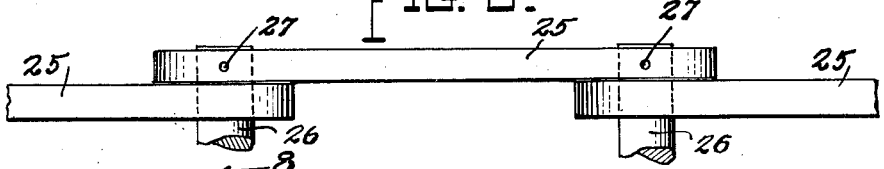
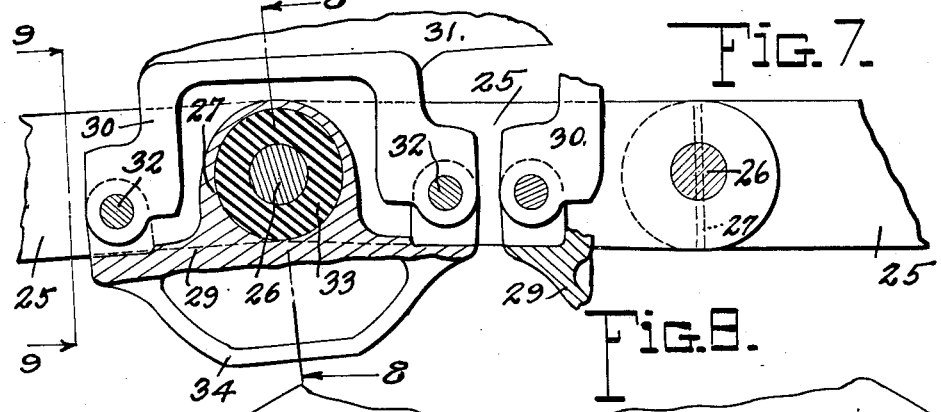
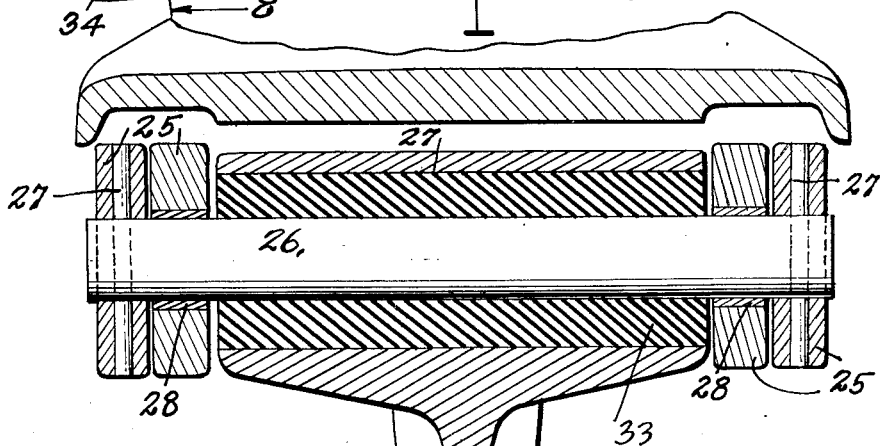
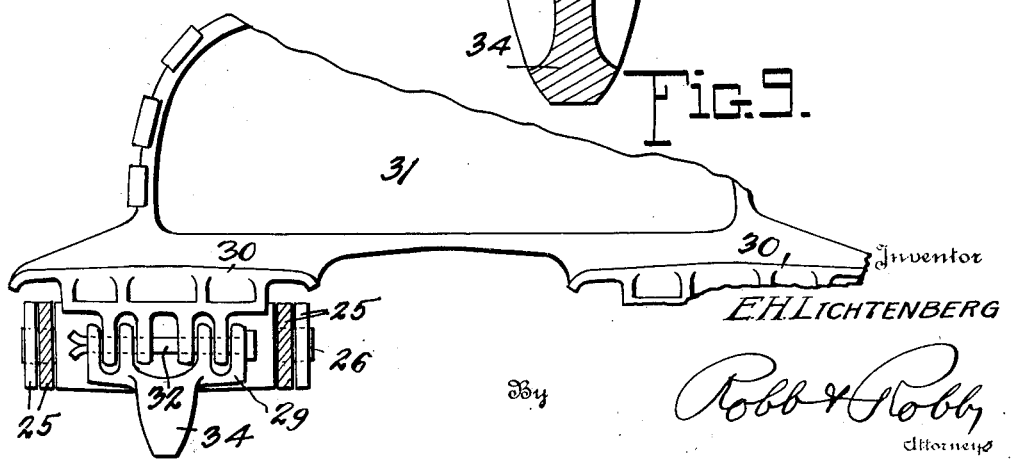
Inventor
E. H. LICHTENBERG
By Robb & Robb
Attorneys Patented Feb. 7, 1933

1,896,711

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION OF WISCONSIN

RUBBER JOINTED CHAIN FOR TRENCH EXCAVATING DEVICES

Application filed December 31, 1930. Serial No. 505,887.

This invention relates to excavators and more particularly to digger chains primarily adapted for use in trench excavating machines.

In machines of this character in which endless digger chains on which the digging buckets are mounted are employed, the chain is generally made up of separate links connected together by metallic pin members, the chain being driven by a suitable power actuated sprocket. Other forms of metallic joints or connections between the links of the chain have been used heretofore, but all these types of joints are subject to rapid wear by the continuous flexing of the chain during operation, and especially in digging in sandy or gritty soil, the grit working into the joints and greatly increasing the wear. Such metallic joints are very noisy in operation and readily transmit shocks and vibrations produced by the digging operation to the machine as a whole, thereby frequently causing failures in various part of the machine.

It is an object of the present invention to dispense with the pin or other metallic form of joint by which the links forming the chain member are connected together, thereby providing a quiet operating unit and increasing the length of life of the excavator.

A further object of the invention is to provide a flexible digger chain which will absorb the usual transmitted shocks and vibrations and which will give in addition to the normal bending movements a lateral or sidewise flexibility whereby to protect the boom when the chain or buckets strike an obstruction or an integral part of the chains which control the raising and lowering movements of the boom.

A still further object of the invention is to provide a chain wherein the separate links are yieldably connected together, said yieldability being afforded by the use of cushions of rubber or other resilient material for taking up the movement between the adjacent links and dispensing with the usual pin or other metallic joint.

According to the invention, another object is to provide a digger chain so constructed as to facilitate the assembly of the parts and the replacement of bucket links or units.

Other and further objects and advantages of the invention will be hereinafter set forth and the novel features thereof defined by the appended claims.

In the drawings:

Fig. 1 is a fragmentary side elevation of a portion of the digger chain on which the buckets are mounted, the chain being shown in engagement with a sprocket;

Fig. 2 is a fragmentary sectional view taken longitudinally through a portion of the chain;

Fig. 3 is a fragmentary sectional view similar to Fig. 2, showing the links in slightly flexed position;

Fig. 4 is a view taken approximately on the line 4—4 of Fig. 2, certain of the parts being shown in elevation;

Fig. 5 is a sectional view taken on the line 5—5 of Fig. 2;

Fig. 6 is a fragmentary plan view of one side of a modified form of digger chain;

Fig. 7 is a fragmentary sectional view taken longitudinally through a portion of the digger chain, parts being shown in elevation;

Fig. 8 is a transverse sectional view taken on the line 8—8 of Fig. 7; and

Fig. 9 is a sectional view taken on the line 9—9 of Fig. 7.

Like reference numerals designate corresponding parts in the several figures of the drawings.

Referring particularly to Fig. 1, 1 denotes a sprocket carried by a shaft 2, said sprocket and shaft being suitably mounted for rotation on the boom (not shown) of the excavator. The digger chain, which is designated generally by the reference character 3 in this figure, is of an endless construction on which the digging instrumentalities or buckets 4 are mounted at intervals in any suitable manner, the mounting for the buckets preferably forming a part of the connection for the separate links of the digger chain. As shown in Fig. 4, the buckets may be carried by a pair of digger chains arranged in side by side relation and suitably spaced from each other, each chain having its driving sprocket.

Specifically referring to the digger chain construction forming the embodiment of the present invention, the chain, as shown in Figs. 1 to 5, is preferably formed of a plurality of separate, spaced link members 5 of substantially rectangular shape having end walls 6 and side walls 7 of substantial height, the end walls being provided at their upper edges with outwardly projecting lateral flanges 8, and at their lower edges with inwardly projecting lateral flanges 9. Intermediate the end walls and extending transversely of the links between the side walls are reinforcing ribs 10. Suitable blocks of rubber, or other resilient material, 11 are positioned intermediate the adjacent end walls of the links for maintaining the same in spaced relation to each other, the lateral flanges 8 resisting upward displacement of the blocks.

Encircling the adjacent ends of the link members 7 are complemental connecting members 12 and 13 adapted to be detachably secured to each other by pins 14. One of the complemental sections 13 of each of the link connecting units is provided with a suitable driving lug 15 for engaging the sprockets about which the digger chain extends. Certain others of the complemental sections 12 of the connecting members carry the digging instrumentalities 4, preferably integrally formed therewith, whereby to provide a bucket unit which may be readily replaced as desired.

It will be observed that each of the sections 12 of the connecting members includes a socket into which the spaced adjacent ends of the link members 7 and the resilient block 11 extend. Intermediate the end walls of the links and the walls of the socket are positioned additional suitable blocks of rubber or other resilient material 16 and 17, the lower flanges 9 of the end walls of the link members retaining the blocks in their proper position in a substantially closed housing. The complemental sections 13 are preferably each provided with a suitable projection or seat 18 for engaging the resilient block 11 to maintain the same in position between the adjacent ends of the link members and substantially forming with the end walls and lateral flanges, a closed housing.

From the foregoing, the operation of the links should be obvious and may be briefly described as follows:

Upon flexing the links, the resilient blocks are deformed, as shown best in Fig. 3, the various parts readily taking their proper positions incident to the flexure. A sidewise flexing is also permitted in addition to the normal longitudinal flexing, this being especially desirable for preventing the subjection of the boom to abnormal strains caused by shocks of the buckets or the chain proper against obstructions. It will also be observed that the buckets are yieldable with respect to the separate links forming the chain since the complemental connecting members 12 and 13 are not rigidly connected at any place with the link members but are maintained in spaced relation thereto by the resilient blocks 16 and 17, thereby forming what might be called a floating joint. Such a joint permits universal movement of the buckets with respect to the chain. By the use of the term "yielding" in this application, it is to be understood that it is meant that the various parts may "give" with respect to each other, which movements are cushioned by suitable resilient members.

It will be apparent that the chain is formed of comparatively few parts which may be quickly and readily assembled or disassembled by the insertion or withdrawal of the pin members 14. In this manner, replacements of the bucket units when desired is greatly facilitated.

The link members are preferably provided at each side with guide flanges or skirts 19 for maintaining the digger chain in position on the sprockets.

A modified form of digger chain construction is illustrated in Figs. 6 to 9. In this construction, link members 25 are arranged to form a pair of spaced endless chains, the links being connected together by transverse pin members 26 forming a common connection for opposite links of each chain. The pin members are preferably fixedly secured to the link members, as by means of a pin 27 extending through one of the links and pin at the joint. If desired, the other link at the joint may be provided with a suitable bushing 28 for reducing the wear by virtue of the flexing of the link.

Mounted on the pin members 26 are complemental sections 29 and 30 which carry the digging instrumentalities 31, as in the construction shown in Figs. 1 to 5. The sections are suitably secured together by pin members 32 which may be readily removed to permit replacement of one of the parts as desired. In this form of the invention, the resilient cushion provides a yieldable mounting for the bucket and is in the form of a cylindrical sleeve 33 which is preferably vulcanized to the pin members 26 as well as to the casing or shell 27 surrounding the same, the casing constituting one of the complemental sections. Suitable driving lugs 34 are provided, as in the other form of the invention hereinbefore described.

It will be observed that in the operation of this chain, the digging instrumentalities are yieldable with respect to the link and pin members 25 and 26, although the connection for the link members themselves is not a yieldable connection. Likewise, the driving means for the digger chain are yieldable with respect to the links and pin members so as to absorb the shocks imparted to the chain by the driving sprockets. The vulcanizing of the resilient cushions 33 to the pin members 26 and casings 27, and the rigid connection between the pin members 26 and one of the link members at the joint, prevent any free rotation of the digging instrumentalities about the supporting pin members. Obviously any other suitable means for securing the cushion to the pin members and casings to prevent free rotation of the digging instrumentalities about the pin members other than by vulcanization might be employed.

It will be understood that the sprocket 1, digger chain 3, and driving lugs 15 constitute driving members of the assembly, the digging instrumentalities 4 being regarded as the driven members of this construction.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. A digger chain comprising spaced links, yieldable spacing means interposed therebetween, connecting means encircling the adjacent ends of said links, and yieldable spacing means interposed between the ends of said links and said connecting means.

2. A digger chain comprising spaced links, yieldable spacing means interposed therebetween, separable connecting means encircling the adjacent ends of said links, and yieldable spacing means interposed between the ends of said links and said connecting means.

3. A digger chain comprising spaced links, yieldable spacing means interposed therebetween, separable complemental connecting means encircling the adjacent ends of said links, means for connecting the same together, and yieldable spacing means interposed between the ends of said links and said connecting means.

4. A digger chain comprising spaced links, yieldable spacing means interposed therebetween, separable complemental connecting means encircling the adjacent ends of said links, means for connecting the same together, yieldable spacing means interposed between the ends of said links and said connecting means, digging instrumentalities carried by certain of said complemental connecting means, and driving means carried by certain others of said complemental connecting means.

5. In an excavator of the class described, a digger chain comprising a plurality of articulated links, digging instrumentalities carried thereby, said digging instrumentalities having sockets formed on one extremity thereof for receiving the adjacent ends of certain of said links, resilient members intermediate the walls of said socket and the ends of said links for cushioning the digging instrumentalities relative thereto, and driving lugs detachably connected to said digging instrumentalities.

6. A digger chain comprising spaced links, resilient spacing blocks interposed therebetween, connecting members substantially encircling the adjacent ends of said links, digging instrumentalities carried by certain of said connecting members, driving lugs carried by certain others of said connecting members, and means for disconnecting said links.

7. In an excavator of the class described, a digger chain comprising a plurality of links yieldably connected together, digging instrumentalities yieldably carried by certain of said links, driving lugs on said chain, a driving sprocket for said chain, and means formed on said links for preventing lateral displacement of said chain with respect to said sprocket.

8. In an excavator of the class described, a digger chain comprising a plurality of links yieldably connected together, digging instrumentalities yieldably carried by certain of said links, driving lugs on said chain, a driving sprocket for said chain, and means formed on said links for preventing lateral displacement of said chain with respect to said sprocket, said means comprising a skirt formed on said links on opposite sides of said driving sprocket.

9. A digger chain comprising a plurality of spaced substantially rectangular links having walls of substantial height, a reinforcing web extending transversely between the side walls intermediate the ends thereof, the end walls having lateral offstanding flanges formed on their upper extremities and extending outwardly of the links, a block of resilient material interposed between the adjacent end walls of said spaced links, connecting means for said links comprising supplemental sections encircling the adjacent end walls of said links and said resilient block, one of said sections having a bearing surface for completing the enclosure of said resilient block by the adjacent end walls and lateral flanges of the links, separate resilient blocks interposed between the other section of said complemental connecting means and the adjacent end walls of said links, said end walls having lateral offstanding flanges formed on their lower extremities extending inwardly of the links for completing the enclosure of said last mentioned resilient blocks by the connecting means and the end walls of the links, driving means for said chain, and digging instrumentalities carried by the chain in spaced relation to each other.

10. A digger chain comprising a plurality of links yieldably connected together, certain of said links carrying digging instrumentalities yieldably mounted for universal movement.

11. A digger chain comprising a pair of spaced endless chains composed of a plurality of flat link members, connecting means therefor, said connecting means extending transversely between said chains, digging instrumentality supporting means yieldably carried by said connecting means intermediate said spaced chains, said supporting means comprising complemental separable members and means for securing the same together, one of said complemental members having a casing surrounding said transverse connecting means and constituting the mounting for said digging instrumentality supports, a resilient cushion in said casing intermediate the inner face thereof and said connecting means, driving lugs on one of said complemental supporting members, and digging instrumentalities carried by certain others of said supporting members.

12. A digger chain comprising a plurality of link members connected together to form an endless chain, pin members fixedly secured to certain of the link members of said chain and extending transversely thereof, resilient sleeves surrounding said pin members, said sleeves being formed of vulcanizable material and vulcanized to said pin members, a casing surrounding said sleeves, said sleeves being vulcanized to the casings, digging instrumentalities secured to the said casings whereby to provide a yieldable mounting of the same with relation to said link and pin members, and driving lugs secured to said casings.

13. A digger chain comprising driving members, and driven members, said driving members comprising lugs adapted to engage a sprocket, said driven members constituting digging instrumentalities, yieldable means common to both the driving and driven members for cushioning the same, and chain forming links associated with the driven and driving members to complete the chain.

14. A digger chain comprising driving members, driven members connected with the driving members and operable thereby, supporting links for the driven and driving members, and yieldable means intermediate the supporting links and said driven and driving members to cushion the driven and driving members incident to the digging shock and driving effects upon the driving members, respectively.

In testimony whereof, I affix my signature.

ERICH H. LICHTENBERG.

CERTIFICATE OF CORRECTION.

Patent No. 1,896,711.                                                    February 7, 1933.

ERICH H. LICHTENBERG.

It is hereby certified that error appears in the printed specification of the above numbered patent requiring correction as follows: Page 3, line 113, claim 9, for "supplemental" read "complemental"; and that the said Letters Patent should be read with this correction therein that the same may conform to the record of the case in the Patent Office.

Signed and sealed this 11th day of April, A. D. 1933.

(Seal)                                                             M. J. Moore,
                                                                         Acting Commissioner of Patents.